(12) United States Patent
Moriarty

(10) Patent No.: US 6,378,872 B1
(45) Date of Patent: Apr. 30, 2002

(54) SEAL ASSEMBLY

(76) Inventor: Maurice J. Moriarty, 21614 N. 59th La., Glendale, AZ (US) 85308

( * ) Notice: Subject to any disclaimer, the term of this patent is extended or adjusted under 35 U.S.C. 154(b) by 0 days.

(21) Appl. No.: 09/360,523

(22) Filed: Jul. 26, 1999

(51) Int. Cl.$^7$ .................................................. F02F 5/00
(52) U.S. Cl. ...................... 277/310; 277/435; 277/446; 277/460; 277/472
(58) Field of Search ................................ 277/435, 446, 277/472, 474, 459, 460, 543, 548, 491, 477, 909, 310, 445

(56) References Cited

U.S. PATENT DOCUMENTS

| 1,152,277 A | * | 8/1915 | Bowen et al. | 277/446 |
|---|---|---|---|---|
| 1,277,291 A | * | 8/1918 | Canfield | 277/446 |
| 1,500,252 A | * | 7/1924 | Marshall | 277/446 |
| 3,811,690 A | | 5/1974 | Moriarty | |
| 4,111,438 A | * | 9/1978 | Longfoot | 277/446 |
| 4,185,842 A | * | 1/1980 | Magara | 277/491 |
| 4,240,644 A | * | 12/1980 | Busto | 277/436 |
| 4,367,702 A | * | 1/1983 | Lassanske | 123/182 |
| 4,962,691 A | * | 10/1990 | Kanao | 92/208 |

* cited by examiner

Primary Examiner—Anthony Knight
Assistant Examiner—Alison K. Pickard
(74) Attorney, Agent, or Firm—Parsons & Goltry; Robert A. Parsons; Michael W. Goltry

(57) ABSTRACT

In an annular groove carried by one of a pair of reciprocally movable members, a pin extending into the annular groove and a sidewall of the other one of the pair of reciprocally movable members, a seal assembly comprising a ring carried by an annular body mounted in the annular groove for sealing the reciprocally movable members for minimizing fluid leakage between the members, wherein the pin extends into and through a notch carried by the annular body and an end gap of the ring for retarding rotation of and between the annular body and the ring.

17 Claims, 1 Drawing Sheet

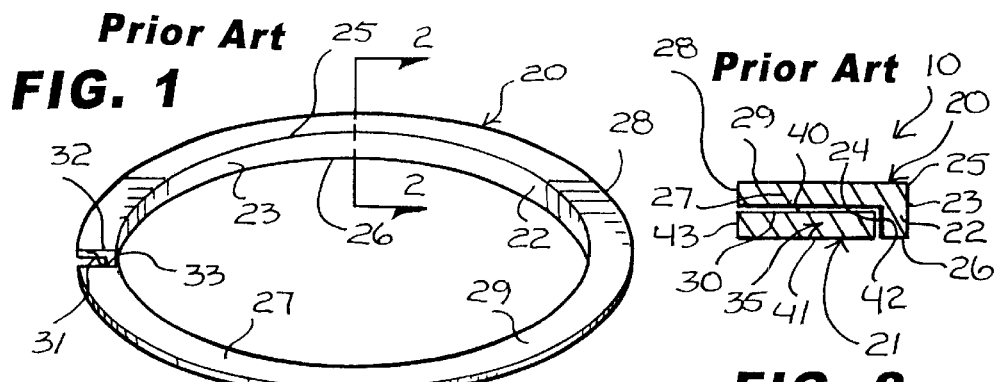
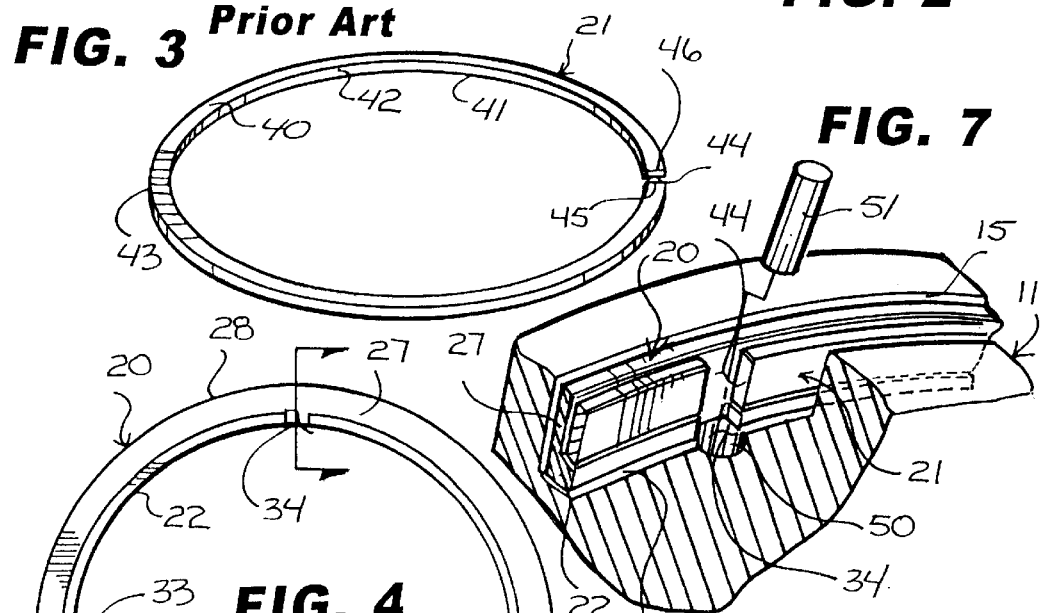
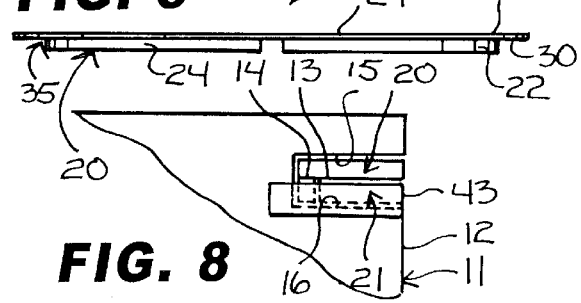
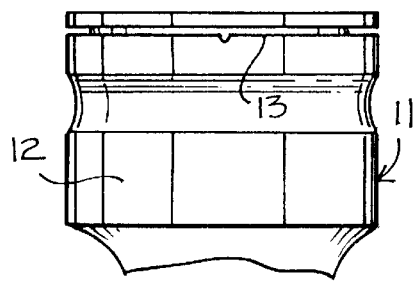

SEAL ASSEMBLY

FIELD OF THE INVENTION

This invention concerns seals and, more particularly, annular seals of a type for minimizing fluid leakage between reciprocally movable members.

BACKGROUND OF THE INVENTION

Various mechanical apparatus include first and second members, which are substantially coaxial and disposed for relative reciprocal movement. Exemplary are internal combustion engines, positive displacement pumps, pneumatic motors and other mechanical devices incorporating a piston and a cylinder assembly. Other examples will occur to the skilled artisan.

Commonly, the cylinder is defined by a bore having a cylindrical sidewall. The piston, a generally cylindrical member, includes a sidewall and a top. An end wall or head, opposing the top of the piston, closes one end of the bore. A chamber of variable capacity is defined within the bore between the head and the top of the piston. Pressurized fluid functions in this chamber. In an internal combustion engines, the fluid is the expanding gas of combustion which ignites and propels the piston downwardly or away from the head. Pressurized fluid from an external source is introduced into the chamber of a pneumatic motor to force movement of the piston. In a pump, which is companion to the engine and to the pneumatic motor, fluid is compressed and pressurized in the chamber.

To provide for relative movement between the members, the diameter of the piston must be less than the diameter of the bore. Frequently, substantial clearance is required. For example, it is well known that a piston is more sensitive to thermal expansion than is a cylinder. Accordingly, where heat is a factor, such as in internal combustion engine, additional space must be provided between the sidewall of the bore and the sidewall of the piston to accommodate thermal expansion of the piston. The space, commonly referred to as sidewall clearance, is generally in the range of fifteen ten-thousandths of an inch to five one-thousandths of an inch, or greater.

However, the piston must be sealed to the cylinder. Conventionally, this is accomplished by a device commonly referred to as a piston ring, an annular seal usually fabricated of metal such as cast iron. The ring is received within a mating annular ring groove formed into the sidewall of the piston. To facilitate expansion during installation, and for other reasons, the ring is radially severed.

The spacing between the opposed ends of the severed ring, known as the end gap, serves various functions after installation. Having an inherent tendency to expand, the ring maintains tension for attendant sealing against the sidewall of the cylinder as the bore increases in diameter as a result of wear. The end gap also allows for thermal expansion of the ring resulting from heat generated by friction, compression of fluid, combustion of fuel and other sources.

Although necessary and even beneficial, the end gap is also the source of considerable concern. Normal end gap clearance in a newly installed ring ranges from approximately ten one-thousandths of an inch to approximately forty one-thousandths of an inch. The end gap defines a path for leakage of fluids between the sidewall of the piston and the sidewall of the bore. Throughout the life of the device, the piston ring continuously expands as compensation for normal wear. As a result, the end gap ever increases with corresponding increase in leakage, usually referred to as a blow-by.

Efficiency, economy and service life of the apparatus is directly related to blow-by. In general, less than optimum output of the apparatus results from loss of pressure or compression of the fluid. Other deleterious effects are unique to the particular apparatus. In an internal combustion engine, for example, contaminating by-products of combustion suspended in the blow-by gases are carried into the lubricating system, which harms components throughout the engine.

In recognition of the desirability of enhancing the seal between the piston and the cylinder, the prior art has proposed various seals, which purportedly reduce or eliminate blow-by. Several prior art proposals are direct attempts to eliminate the end gap in the conventional piston ring. Various proposals include an insert, which spans the end gap and is received in a notch formed into the ring on either side of the end gap. Other proposals include the use of a relatively thin steel member, alternately named a ribbon member or a gap seal member, having a substantially rectangular cross-section. Also advanced is a plurality of severed annular members, installed in stacked arrangement with staggered end gaps. The prior art has also advocated the use of thin steel members, colloquially dubbed rails, in combination with ring members having a general resemblance to conventional piston rings. Being of substantially heavier construction than a rail and usually fabricated of malleable material, such as cast iron, the ring member is variously referred to as a packing member or a sealing ring. The ring member in combination with the rail member comprise a seal assembly of which various embodiments are known.

In accordance with one known arrangement, the rail resides within an annular groove formed into the inner circular wall of the seal member and exerts outwardly directed radial pressure to hold the seal member in contact with the sidewall of the bore. In another configuration, the rail occupies a space between the top of the seal member and the upper radial surface of the containing ring groove. Still other formations orient the radial axis of the rail at an angle.

For various reasons, annular seals of the foregoing character are not entirely satisfactory. For example, in an assembly wherein the rail resides within the seal member and exerts an expansive force, excessive friction is generated against the sidewall of the bore. Where only the rail contacts the sidewall, seating or breaking-in of the seal is substantially retarded or even prohibited. An angled rail is subject to vibration, commonly known as ring flutter, when used in connection with a rapidly reciprocating piston. A thin steel member exposed to extreme heat, such as when utilized as the top compression ring in an internal combustion engine, will become distorted.

Seal assemblies of the above character where devised mainly during the time period ranging from approximately the middle nineteen thirties to early nineteen fifties. During the early nineteen seventies, there was developed a seal assembly, which substantially remedied the foregoing deficiencies inherent in the prior art. Distributed by POWER-FORMANCE INTERNATIONAL CORPORATION under the trademark TOTAL SEAL®, the seal assembly has achieved commercial success, especially for use in connection with four-stroke cycle internal combustion engines.

Briefly, the Total Seal® device, referred to as a ring set, includes a sealing ring member and a gap seal member. The sealing ring member, a severed annular member preferably fabricated of malleable metal such as cast iron, has thickness and radial dimensions to be received within a conventional piston ring groove in accordance with standard tolerances.

Extending inwardly from the outer cylindrical surface along the underside of the sealing ring member is an annular recess in which is received the gap seal member. The intricacies and advantages of the ring are described in U.S. Pat. No. 3,811,690 and are well known to those having regard for the art.

Notwithstanding continuing success in the trade, the Total Seal® ring set has proven less than optimum for engines having circumferential intake and/or exhaust ports such as found in two-stroke cycle engines. As installed, the respective end gaps of the sealing ring member and of the gap seal member are diametrically opposed. The elastic expansiveness or outward radial force of a severed annular seal under tension is gradiently distributed throughout. Therefore, while the set as an assembly is free to move or work within the ring groove, theoretically, movement between the members should be prohibited as the result of the relative forces therebetween.

Extensive use in testing has shown that occasionally relative movement will occur between the members. The ultimate relative movement is capable of aligning the respective end gaps. While the other advantages of the set remain, leakage can occur. Furthermore, the ends of the rings at the gap, when aligned with a port in a two-stroke cycle engine instead of the solid sidewall, can be sheared off in what is typically known as "clipping".

Considerable research and development has been directed toward devising a ring set which will retain the numerous benefits of the present Total Seal® ring set and yet provide additional benefits and resolve other problems of long-standing in the art. Substantial attention has been directed to an assembly in which the possibility of leakage is minimized and "clipping" is eliminated. Thus, consideration has been given to extending the utility of the assembly for use in additional applications, including internal combustion engines having sleeve or port valves such as a two-stroke cycle engine and to making practical a piston having a single compression ring.

It would be highly advantageous, therefore, to remedy the foregoing and other deficiencies inherent in the prior art.

Accordingly, it is an object of the invention to provide improved means for sealing between a pair of coaxial components having relative reciprocal movement therebetween.

Another object of the invention is the provision of improved sealing means especially adapted for use with internal combustion engines, positive displacement pumps, linear fluid actuated motors and other apparatus having a bore encircling a piston, shaft or other reciprocally movable component.

And another object of the invention is to provide an improved annular seal of the normally severed type as exemplified by the conventional piston ring.

Still another object of the invention is the provision of a seal assembly having ameliorating means for materially reducing the possibility of leakage between the bore and the reciprocally movable member.

Yet another object of the invention is to provide a seal assembly particularly useful in a two-stroke cycle engine.

And a further object of the invention is to provide a seal assembly having an extended service life.

Still a further object of the invention is the provision of a seal assembly that is easy to install.

And still a further object of the invention is the provision of a seal assembly according to the foregoing which is adapted for use in mechanisms having an opening in the sidewall of the bore.

And yet still a further object of the invention is the provision of a new and improved method of sealing together reciprocally movable members.

SUMMARY OF THE INVENTION

The above problems and others are at least partially solved and the above purposes and others realized in a new and improved seal assembly for use in minimizing fluid leakage between a pair of reciprocally movable members. An annular groove is formed in one of a pair of reciprocally movable members, and the other one of the pair of reciprocally movable members includes a sidewall. A pin extends into the annular groove. The seal assembly of the invention includes an annular body and a ring, carried by the annular groove. The annular body includes a notch, an end gap severing the annular body, an annular recess and a bearing surface. The ring is carried by the annular recess and held in place against portions of the annular groove. The ring includes an end gap severing the ring and a bearing surface that cooperates with the bearing surface of the annular body to form a contact surface in sealing engagement to the sidewall. The pin extends into and through the notch of the annular body and the end gap of the ring for retarding rotation of and between the annular body and the ring. The end gap of the annular body is offset relative to the end gap of the ring.

In a specific embodiment, substantially axial and opposed radial surfaces define the annular groove, and the annular body includes an annular endwall directed against the substantially axial surface, and an annular flange extending away from the annular endwall and directed against one of the opposed radial surfaces. The notch is preferably carried by the annular endwall, the contact surface is preferably arcuate, the annular body is removable from the annular groove and the ring is removable from the annular body. To keep the contact surface in sealing engagement with the sidewall, the annular body exerts a force in a direction toward the sidewall.

Consistent with the foregoing, the invention also includes associated methods of sealing together reciprocally movable members.

BRIEF DESCRIPTION OF THE DRAWINGS

The foregoing and further and more specific objects and advantages of the invention will become readily apparent to those skilled in the art from the following detailed description thereof taken in conjunction with the drawings in which:

FIG. 1 is a perspective view of a seal assembly for use in sealing together a pair of reciprocally movable members, the seal assembly including an annular body and an annular ring, in accordance with the invention;

FIG. 2 is a sectional view taken along line 2—2 of FIG. 1;

FIG. 3 is a perspective view of the annular ring shown in FIG. 2;

FIG. 4 is a bottom plan view of the annular body of FIG. 1;

FIG. 5 is a side view of the annular body of FIG. 1;

FIG. 6 is a side view of a piston;

FIG. 7 is an enlarged fragmented perspective view of the seal assembly of FIG. 1 shown as it would appear installed in the piston of FIG. 6; and FIG. 8 is a side sectional view of the seal assembly of FIG. 1 shown as it would appear installed in the piston of FIG. 6.

DETAILED DESCRIPTION OF A PREFERRED EMBODIMENT

Turning to the drawings, in which like reference characters indicate corresponding elements throughout the several views, FIG. 1 illustrates a seal assembly 10 for use in sealing together a pair of reciprocally movable members. Although not shown, the reciprocally movable members are disposed for relative reciprocal movement along a linear axis. Such a mechanism is typically representative of internal combustion engines, positive displacement pumps, linear fluid actuated motors and similar apparatus including a first member or piston and a second member or cylinder having a cylindrical or continuous sidewall. Referring momentarily to FIG. 6, shown is a typical piston 11. In a typical arrangement, the cylindrical sidewall is coaxial with and spaced from outer cylindrical sidewall 12 of piston 11. This space, commonly termed sidewall clearance, is necessary to ensure relative movement between the members. To retard leakage, piston 11 carries an annular groove 13, commonly known in the art as a ring groove. Annular groove 13 can accommodate a conventional piston ring or, regarding this invention, seal assembly 10. Seal assembly 10 minimizes fluid leakage between the reciprocally movable members. As shown in FIG. 8, annular groove 13 is open, generally rectangular in cross section, and is defined by the cooperation between a substantially axial surface 14 and opposed radial surfaces 15 and 16. Annular groove 13 opens outwardly.

Seal assembly 10 is dimensioned for receipt within conventional ring groove 13 in accordance with standard tolerances. Regarding FIGS. 1 and 3, seal assembly 10 comprises an annular body 20 and an annular rail or ring 21, the general structure and function of which is set forth in U.S. Pat. No. 3,811,690, which is incorporated by reference herein. Annular body 20 is preferably constructed of a malleable material such as cast iron or other similarly ductile material, and ring 21 is preferably constructed of steel. Referring to FIG. 1, annular body 20 is L-shaped and includes an annular endwall 22, having inner and outer opposing axial surfaces 23 and 24 (outer axial surface 24 shown in FIG. 5 illustrating a side view of annular body 20), a proximal end 25 and a free or distal end 26. An annular flange 27 extends outwardly from proximal end 25 in opposition to axial surface 23 terminating with a free annular extremity or bearing surface 28. Flange 27 defines opposing radial surfaces 29 and 30 (radial surface 30 referenced in FIG. 5). With additional reference to FIG. 4 illustrating a bottom plan view of annular body 20, end gap 31 severs annular body 20 and defines spaced-apart free ends 32 and 33. A notch 34 is formed into and through endwall 22 that, in addition to end gap 31, substantially severs endwall 22. Axial surface 24 of endwall 22 and radial surface 30 of flange 27 cooperate to define, as best seen in FIG. 5, an annular recess or pocket 35. Regarding FIG. 3, ring 21 includes opposing radial surfaces 40 and 41, an inner axial surface 42 and an outer or bearing surface 43. An end gap 44 severs ring 21 and defines spaced-apart free ends 45 and 46. Recess 35 removably accommodates ring 21.

Properly positioned in recess 35, as shown in FIG. 2 illustrating a sectional view taken along line 2—2 of FIG. 1, axial surface 42 of ring 21 rests against or adjacent axial surface 24 of annular body 20, radial surface 40 of ring 21 rest against or adjacent radial surface 30 of flange 27, and end gap 44 aligns with notch 34 as shown in FIG. 7. Properly installed, end gap 31 of annular body 20 is offset relative end gap 44 of ring 21 in a range of, for instance, at least 5° to 90°. The offset will depend on the spacing of the ports of the two-stroke cycle engine in which seal 10 is to be used. Gap 31 and gap 44 are offset so as to each be positioned adjacent a solid portion of bridge of the sidewall of the cylinder, and not the ports.

The bearing or contact surface of this described preferred embodiment comprises bearing surface 28 of annular body 20 and bearing surface 43 of ring 21. In use, bearing surfaces 28 and 43 are in sealing engagement with the cylindrical sidewall of the cylinder. Bearing surface 43 can be heat treated and/or coated with chrome or other protective anti-wear or anti-friction material for the purposes of wear and reduction of friction. Typically, a chrome plating may range between two one-thousandths and three one-thousandths of an inch.

So assembled, seal assembly 10 is receivable by the annular groove 13 of piston 11 as shown substantially in FIGS. 7 and 8 in accordance with standard tolerances for sealing engagement with the cylindrical sidewall of a cylinder. Properly installed, annular body 20 resides or otherwise rests in and against annular groove 13 so as to support and direct bearing surfaces 28 and 43 in sealing engagement to or against the cylindrical sidewall of an opposing cylinder. Annular body 20 holds ring 21 in place against radial surface 16 of annular groove 13. Annular body 20 and ring 21 are elastically expansive or biased to exert an outward force toward or against the cylindrical sidewall. The outwardly biased forces urge the bearing surfaces 28 and 43 toward and against the cylindrical sidewall in sealing engagement. In the desired orientation, each annular member serves to seal or close the end gap of the other member thereby eliminating the fluid leakage path inherent in conventional prior art piston rings.

The outwardly biased forces act to prohibit relative movement between the annular body 20 and ring 21 of seal assembly 10 under forces of reciprocating movement. However, it has been noticed that relative rotation can occur which can result in fluid leakage. Like most pistons, and especially those found in conventional two-stroke internal combustion engines, piston 11 includes a bore 50 that accommodates and holds a fixture or pin 51. Pin 51 extends into annular groove 13. With seal assembly 10 properly installed, pin 51 extends into and through notch 34 and end gap 44 of ring 21 for retarding rotation of and between the annular body and the ring. This prevents fluid leakage and prevents free ends 32 and 33, defining end gap 31 of annular body 20, and the free ends 45 and 46, defining end gap 44 of ring 21, from migrating to, and clipping against, any openings leading to the cylindrical sidewall. These openings may comprise fuel supply and exhaust ports.

Annular body 20 is sized to be removably received within annular groove 13. Properly installed, endwall 22 is directed toward or against axial surface 14, and an annular flange 27 extends away from endwall 22 adjacent or against radial surface 15, which allows notch 34 and end gap 44 of ring 21 to accommodate pin 51. In accordance with conventional practice, the axial dimension of annular body 20 is approximately one one-thousandths to four one-thousandths of an inch narrower than groove 13. This clearance allows seal assembly 10 to move or work within groove 13, and further allows it to be easily installed and removed. Preferably, the cross-sectional dimensions of annular groove 13 are slightly larger than the cross-sectional dimensions of annular body 20. As a result, ring 21 may be readily installed within and removed from recess 35 and annular groove 13.

In accordance with a preferred embodiment of the invention, the elastic expansiveness or outwardly directed radial force of each of annular body 20 and ring 21 is significant. Annular body 20 exerts a total outward force of between three to twelve pounds, depending on the needs of the user and the specific application. The outwardly directed force of ring 21 is, in comparison, generally negligible. In other words, ring 21 is substantially neutral and is in a relatively relaxed state when installed as compared to the bias provided by annular body 20. The fabrication of annular seals having prescribed elastic expansiveness will readily occur to the skilled artisan.

Seating of seal assembly 10, the mating with the cylindrical sidewall of the bore, is an important consideration in the art. As initially installed, bearing surfaces 28 and 43 comprise the contact surface that provides sealing engagement between piston 11 and a cylindrical sidewall. Due to the inherent characteristics of annular body 20 and ring 21 and, more particularly, bearing surfaces 28 and 43, bearing surfaces 28 and 43 are not easily worn away during initial and prolonged operation. Accordingly, seating of the seal assembly 10 is accomplished upon installation and no appreciable wear-in is required. The outwardly directed force of ring 21 facilitates the sealing engagement of bearing surfaces 28 and 43 to the cylindrical sidewall, the force against the cylindrical sidewall being borne by piston 11.

Over the operating life of the apparatus considered from initial operation to normal time for replacement or rebuild, the diameter of the cylindrical sidewall of the cylinder will somewhat enlarge and the diameter of the seal assembly 10 will somewhat decrease. However, no loss in effectiveness of seal assembly 10 or leakage will occur. As the cylindrical sidewall and the annular body 20 and rail 21 material wear away, annular body 20 will continue to expand to maintain the desired seal of outer bearing surfaces 28 and 43 to the cylindrical sidewall without coming in contact with the cylindrical sidewall. Concurrent with the expansion of annular body 20 and ring 21, end gaps 31 and 44 will increase. Ring 21, however, will continue to function as an end gap seal member. It is noted that because only a small portion of annular body 20 and ring 21 are exposed to heat from the gases of combustion, no warping or distortion will occur. Over an extended period of operation, bearing surfaces 28 and 43 will wear down to such a degree that replacement becomes necessary. At this point in operation, seal assembly 10 may be removed from annular groove 13 and replaced with a new one to resume operation.

The present invention has been described above with reference to a preferred embodiment. However, those skilled in the art will recognize that changes and modifications may be made in the described embodiments without departing from the nature and scope of the present invention. Various changes and modifications to the embodiment herein chosen for purposes of illustration will readily occur to those skilled in the art. To the extent that such modifications and variations do not depart from the spirit of the invention, they are intended to be included within the scope thereof, which is assessed only by a fair interpretation of the following claims.

Having fully described the invention in such clear and concise terms as to enable those skilled in the art to understand and practice the same, the invention claimed is:

1. In an annular groove having substantially axial and opposed radial surfaces carried by one of a pair of reciprocally movable members, a pin attached to the one of the pair of reciprocally movable members and extending into the annular groove and a sidewall of the other of the pair of reciprocally movable members, a seal assembly to be received in the annular groove for sealing engagement with the sidewall for minimizing fluid leakage between the members, the seal assembly comprising:

an annular body to direct against the annular groove, the annular body having a notch, an end gap severing the annular body, an annular recess and a bearing surface; and a ring carried by the annular recess, the ring having an end gap severing the ring and a bearing surface that cooperates with the bearing surface of the annular body to define a contact surface to engage the sidewall;

the pin to extend into and through the notch and the end gap of the ring for retarding rotation of and between the annular body and the ring, and for retarding the annular body and the ring from rotating relative to the annular groove.

2. The seal assembly of claim 1, wherein the end gap of the annular body is offset relative to the end gap of the ring.

3. The seal assembly of claim 1, wherein the end gap of the annular body is offset relative to the end gap of the ring in the range of at least 5° to 90°.

4. The seal assembly of claim 1, wherein the annular body includes an annular endwall to direct against the axial surface, and an annular flange extending away from the annular endwall to direct against one of the opposed radial surfaces.

5. The seal assembly of claim 4, wherein the notch is carried by the annular endwall.

6. The seal assembly of claim 1, wherein the ring is removable from the annular body.

7. The seal assembly of claim 1, wherein the annular body exerts a force in a direction toward the sidewall.

8. In an annular groove carried by one of a pair of reciprocally movable members, a pin attached to the one of the pair of reciprocally movable members and extending into the annular groove and a sidewall of the other of the pair of reciprocally movable members, a seal assembly for sealing together the pair or reciprocally movable members for minimizing fluid leakage between the members, the seal assembly comprising:

an annular body carried by the annular groove, the annular body having a notch, an end gap severing the annular body, an annular recess and a bearing surface; and a ring carried by the annular recess, the ring having an end gap severing the ring and a bearing surface that cooperates with the bearing surface of the annular body to form a contact surface in sealing engagement to the sidewall;

the pin extending into and through the notch and the end gap of the ring for retarding rotation of and between the annular body and the ring, and for retarding the annular body and the ring from rotating relative to the annular groove.

9. The seal assembly of claim 8, wherein the end gap of the annular body is offset relative to the end gap of the ring.

10. The seal assembly of claim 8, wherein the end gap of the annular body is offset relative to the end gap of the ring in the range of at least 5° to 20°.

11. The seal assembly of claim 8, the annular groove defined by a substantially axial and opposed radial surfaces, wherein the annular body includes an annular endwall directed against the substantially axial surface, and an annular flange extending away from the annular endwall and directed against one of the opposed radial surfaces.

12. The seal assembly of claim 11, wherein the notch is carried by the annular endwall.

13. The seal assembly of claim 8, wherein the ring is removable from the annular body.

14. The seal assembly of claim 8, wherein the annular body exerts a force in a direction toward the sidewall.

15. A method of sealing together a pair of reciprocally movable members, one of the pair having an attached pin extending into an annular groove, and the other one of the pair having a sidewall, the method comprising the steps of:

provideing a seal including an annular body having a notch and an end gap severing the annular body, and a ring carried by the annular body and having an end gap severing the ring and offset relative to the end gap of the annular body, the annular body and the ring defining a contact surface;

placing the seal into the annular groove to sealingly engage the contact surface to the sidewall; and orienting the pin into and through the notch and the end gap of the ring for retarding rotation of and between the annular body and the ring, and for retarding the annular body and the ring from rotating relative to the annular groove.

16. The method of claim 15, wherein the step of providing an annular body further includes the step of imparting a bias to the annular body to exert a force toward the sidewall for sealingly engaging the contact surface to the sidewall.

17. The method of claim 15, wherein the step of providing a seal further includes providing the annular body having a recess for receiving the ring and inserting the ring in the recess.

\* \* \* \* \*